Figure 1:
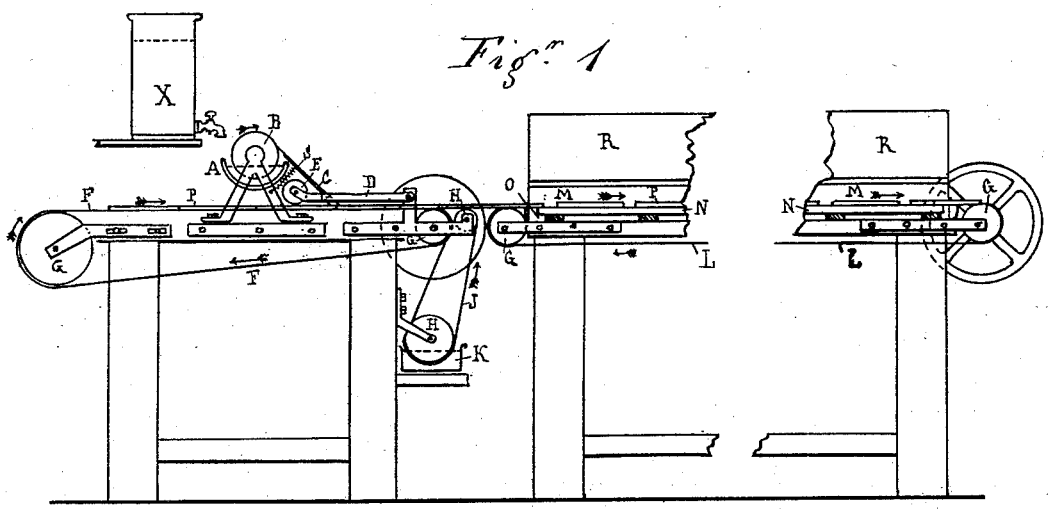

(No Model.)

B. J. EDWARDS.

APPARATUS FOR COATING PHOTOGRAPHIC PLATES.

No. 314,811. Patented Mar. 31, 1885.

WITNESSES:

INVENTOR:

UNITED STATES PATENT OFFICE.

BENJAMIN J. EDWARDS, OF LONDON, COUNTY OF MIDDLESEX, ENGLAND.

APPARATUS FOR COATING PHOTOGRAPHIC PLATES.

SPECIFICATION forming part of Letters Patent No. 314,811, dated March 31, 1885.

Application filed October 22, 1884. (No model.) Patented in England June 5, 1884, No. 8,643.

*To all whom it may concern:*

Be it known that I, BENJAMIN JOSEPH EDWARDS, a citizen of Great Britain, residing at London, in the county of Middlesex, have invented an Improved Apparatus for Coating Photographic Plates or Paper with Gelatine Emulsion, (for which I have obtained a patent in Great Britain No. 8,643, bearing date June 5, 1884,) of which the following is a specification.

My invention, illustrated in the accompanying drawings, relates to an improved method of and apparatus for rapidly applying an even layer or coating of gelatine emulsion to sheets of glass, metal, paper, or other surfaces for photographic purposes.

I carrying out my invention I make use of a trough or vessel containing the emulsion, and also of a metal roller working in bearings and made to revolve in the trough which contains the emulsion with which the plates are to be coated. The length of the roller and trough must be slightly greater than the width of the largest plate to be coated, and I fix the said roller and trough above and across a traveling band or table which carries a continuous train of plates to be coated.

In order to carry out my improved method of applying an even coating of emulsion to the surface of the plates, I make a scraper, preferably of sheet metal or ebonite, of suitable length and thickness, and I fix this scraper parallel to the roller, so as to turn on pins or centers at or near the lower edge, and by means of a lever, weight, or springs, the upper edge of the scraper is made to press against the roller which revolves in the trough; and I make the scraper of a convenient shape and width and fix it at any suitable angle, so that the lower edge rests upon or nearly in contact with the surface of the plates or paper to be coated. When the roller is made to revolve in the emulsion, the solution which adheres to the surface of the roller is taken off by the upper edge of the scraper, toward which the roller revolves. The emulsion then flows down the scraper to the surface of the plates which are carried by the traveling band below. By this means the plates are coated with an even layer of emulsion, the thickness of the coating being regulated by the relative speeds of the roller and the traveling band which carries the plates.

In order to coat plates of various sizes, I make the above-described scraper removable, and when required I replace it by another similar scraper of the length required to correspond with the width of the plates to be coated.

In order to admit of coating plates of different degrees of thickness, I make the centers or pins at the lower edge of the scraper to work in bearings fixed to a movable frame, or pair of side rods pivoted or hinged at one end and carrying at the other end a roller or guide which rests upon the surface of the plates as they pass beneath the scraper. By this means the frame or rods carrying the scraper rises and falls in proportion to the thickness of the plates, which are thus allowed to pass under the scraper without obstruction. Sometimes I attach the scraper to the side of the trough and support the trough itself, with the scraper attached, by means of pivots or bearings upon the movable frame or side rods before described.

In order to facilitate the cooling or setting of the emulsion after it has been spread upon the surface of the plates, I cause the traveling band carrying the plates to pass over a table or slab artificially cooled by being kept partially immersed in ice-water or other cooling substance contained in a metal tray, within which the slab rests, and I cover the table with a metal tank containing ice or other cooling substance. The tank is supported so that the under side is only a short distance above the slab, thus forming of the space between the slab and the under side of the tank or cover a cooling chamber or tunnel, through which the plates pass. The cover or tank also serves to protect the plates from light and dust after they have been coated with emulsion.

By the means above described the emulsion is rapidly set and the plates are very quickly ready to be removed from the traveling band and placed in racks to dry. In practice I prefer to make the traveling band in two separate portions of unequal length—that is, I make two endless bands to travel in the same direction. One of these bands, which I call the "coating" band, is used only to carry the plates under the trough and scraper. The plates then pass onto the other band, which I call the "setting" band, and which carries the plates over the cold slab and through the cooling-chamber before described. Each of the above-mentioned bands works over a pair of rollers or drums fitted at one end with a driving-pulley, by means of which the band is made to travel in the required direction, the setting or cooling band being made to travel at a slightly-greater speed than the coating-band, in order to cause the plates to separate from each other as they pass into the cooling-chamber.

For the purpose of cleaning the back or under surface of the plates and removing any emulsion which may have been spilled onto the coating-band, I make another endless band of rubber cloth passing over a pair of rollers of suitable diameter, and I fix one of these rollers so that the cleaning-band just touches the coating-band and the under side of the plates after they are coated, and I arrange the other roller, which is driven by a pulley, so that it revolves in and carries the endless band through a trough of warm water. By this means the back or under surface of the plates is cleaned and the traveling bands are kept clean and free from emulsion. For coating paper with gelatine emulsion for photographic purposes I use my improved machinery and apparatus, substantially as above described, and in a similar manner, with the exception that I dispense with the cleaning-band and the top roller; and I use the other roller and the trough for the purpose of wetting or dampening the paper previous to its being coated; and I use another roller or squeezer for the purpose of removing the excess of moisture and causing the paper to adhere to the coating-band before being passed under the trough and scraper. The paper when coated passes through the cooling-chamber, after which it is cut into convenient lengths and hung up to dry. In this manner a continuous length of paper can be uniformly coated with an even layer of gelatine emulsion of any desired thickness.

In using my improved machinery for coating plates or paper I actuate the rollers and bands by means of pulleys of suitable diameters to give the speed required, and driven by a gas-engine or other suitable motor.

The endless bands may be made of india-rubber cloth or other suitable flexible material; but I prefer to make the band which passes through the cooling-chamber of woven wire or thin metal plate, in order to cool or set the emulsion as rapidly as possible. Sometimes, instead of ice, as above described, I use a current of cold air or vapor for the purpose of setting the emulsion on the plates or paper in the cooling-chamber. In any case this chamber or tunnel must be of sufficient length to allow of the film of emulsion being perfectly set or stiffened before the removal of the plates or paper from the band. The length required will depend greatly upon the speed at which the machinery is driven. With a moderate speed I find fifteen feet a convenient length for the refrigerating chamber or tunnel.

By means of my improved machinery and appliances, as above described, photographic plates or paper may be prepared or coated with gelatine or other sensitive emulsion with greater rapidity, certainty, and uniformity than has hitherto been practicable by any other method.

The accompanying drawings show the various parts of my improved machinery as described in the above specification.

Similar letters indicate similar parts throughout.

I do not, however, confine myself to the precise details of construction as shown or described, as the same may be somewhat modified without departing from the principle of my invention.

Figure 2:
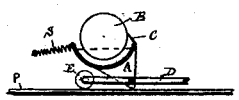

Figure 1 is a side elevation of my machine, the coating-chamber and carrier-belt being partially broken away, and Fig. 2 is a detail view of a modification.

In Fig. 1, A is the trough containing the emulsion. B is the roller. C is the movable and adjustable scraper. D is the pivot-frame which carries the scraper, and sometimes the trough with scraper attached. E is the guiding-roller. F F is the traveling band for coating. G G G are rollers carrying the traveling bands. H H are similar rollers to carry the endless band for cleaning the plates. J is the cleaning-band. K is the trough containing water for cleaning or washing the band. L is the traveling band carrying the plates through the cooling-chamber. M is the cooling chamber or tunnel, closed at the sides and open at each end. N is the cold slab over which the traveling band passes. O is the metal tray in which the slab rests. P P are the plates before and after being coated. R is the metal tank or cover over the cooling-chamber. S is the spring which presses the scraper against the roller. X is a reservoir of emulsion for replenishing the trough.

Fig. 2 shows one modified arrangement of scraper attached to the trough, down the side of which the emulsion may flow to the surface of the plates.

Having now particularly described and ascertained the nature of my said invention and in what manner the same is to be performed, I wish it to be understood that I do not claim any novelty in the use of a roller revolving in a trough of emulsion, as hitherto used for applying a coating of emulsion to the under surface of photographic plates and for other purposes; nor do I claim the use of an endless band for carrying the plates, as described in Swan's English specification, A. D. 1879, No. 4,607; but

I claim as my invention—

1. In an apparatus for coating sheets of glass or paper with gelatine emulsion for photographic purposes, the movable and adjustable scraper or scrapers, of any suitable shape or size, in combination with the roller and trough, for the purpose of applying the coating of gelatine or other emulsion to the upper surface of the plates, substantially as described and shown.

2. In an apparatus for coating photographic plates with an emulsion, the endless band or bands for cleaning the back or under surface of the plates, as described and shown.

3. In an apparatus for coating photographic plates with an emulsion, the combination, with the pivoted frame which carries the scraper, or the trough with scraper attached, of the roller or guide connected with said frame, substantially as described.

B. J. EDWARDS.

Witnesses:
  A. H. REED,
    90 *Cannon St., London.*
  I. D. POLLARD,
    8 *Fairfield Rd., Bow.*